Oct. 11, 1932.　　　　E. KLAHN　　　　1,881,674
AIRCRAFT
Filed July 28, 1931　　　5 Sheets-Sheet 1

INVENTOR
EMIL KLAHN
BY HIS ATTORNEY

Oct. 11, 1932.  E. KLAHN  1,881,674
AIRCRAFT
Filed July 28, 1931   5 Sheets-Sheet 2

INVENTOR
EMIL KLAHN
BY HIS ATTORNEY

Oct. 11, 1932.  E. KLAHN  1,881,674
AIRCRAFT
Filed July 28, 1931  5 Sheets-Sheet 5
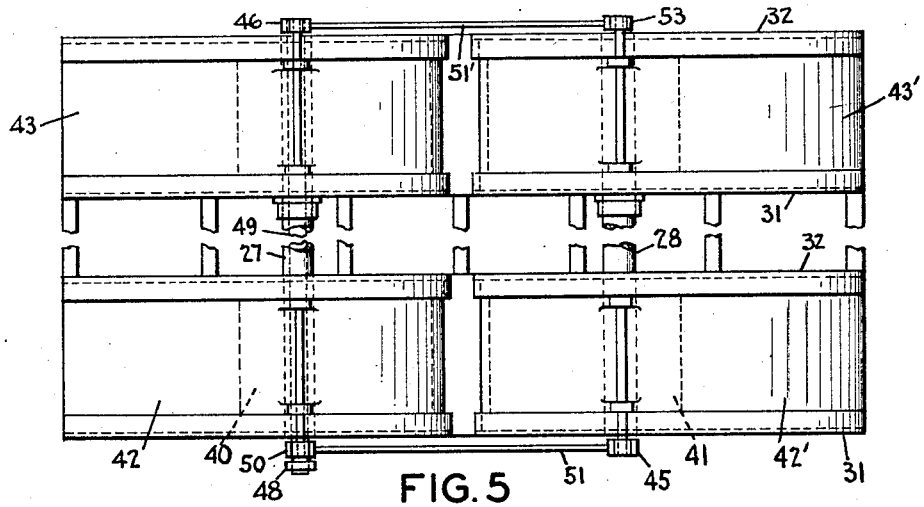
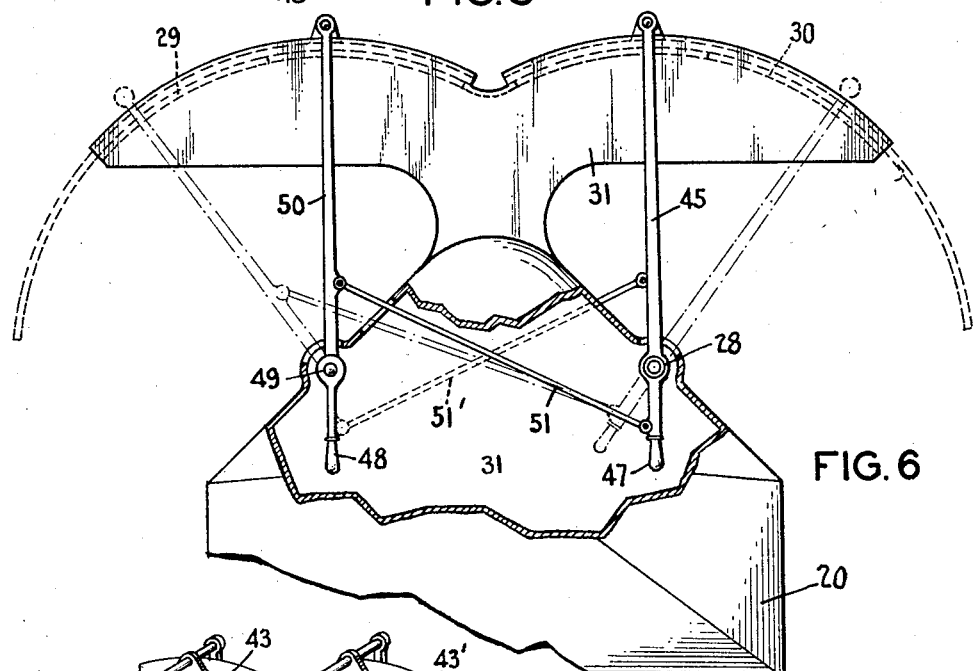
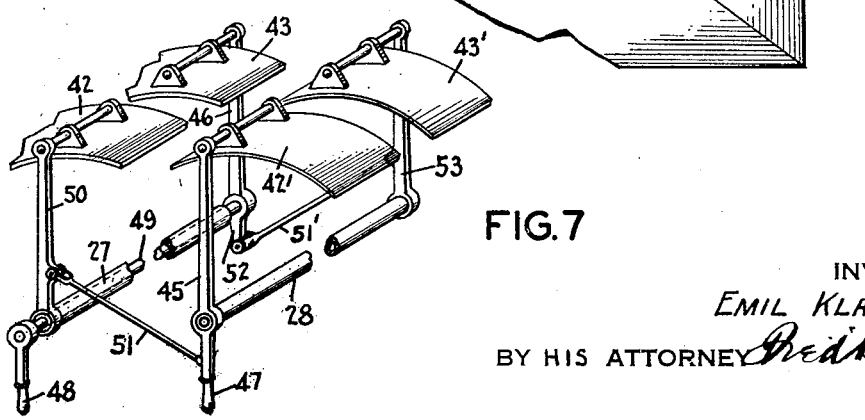
INVENTOR
EMIL KLAHN
BY HIS ATTORNEY Patented Oct. 11, 1932

1,881,674

UNITED STATES PATENT OFFICE

EMIL KLAHN, OF NEW VERNON, NEW JERSEY

AIRCRAFT

Application filed July 28, 1931. Serial No. 553,533.

The invention relates to aircraft of the heavier-than-air type, and more particularly to means for effecting the lifting of said craft.

It has for an object the provision of a wingless aircraft, and of a novel means providing a vertical lifting thrust whereby the craft may be elevated and sustained.

A further object of the invention resides in means for varying the magnitude of this thrust to control at will the rate of rise or fall, as well as to attain stationary or hovering flight with the craft.

Another object of the invention is to provide means whereby the craft may be tilted in a vertical plane so that, in conjunction with horizontal translating means, it may be caused to ascend or descend in a direction at an angle to the vertical.

In carrying out the invention, a suitable motor is arranged to drive a pair, or preferably two pairs, of simultaneously operating rotary tangential fans, each pair having the blades or vanes of the fans interlocking or overlapping and arranged to rotate in opposite directions, said blades being suitably spaced to avoid interference among the same. The fans are suitably encased within casings which are preferably entirely open at the bottom and over a portion of the sides and ends, air being directed by the blades vertically downwardly and the resulting thrust upon the upper wall of a casing utilized in the lifting of the aircraft.

Provision is made, furthermore, for operating shutter or like means over an opening in the said upper wall of a casing whereby the intensity of this thrust may be varied for controlling the rise and fall of the aircraft and for effecting a hovering action thereof.

Provision is also made for effecting translation or horizontal movement of the craft.

The nature of the invention, however, will best be understood when described in connection with the accompanying drawings, in which:

Fig. 5 is a plan view of the casings for the two sets of lifting fans and shows also the casing shutter-moving mechanism.

Fig. 6 is a fragmentary front elevation showing one of the fan casings, with portion of connected cabin broken away, and illustrates the shutter-moving levers and shutters associated therewith.

Fig. 7 is a fragmentary perspective view illustrating the arrangement of the shutter control mechanism.

Figure 1:
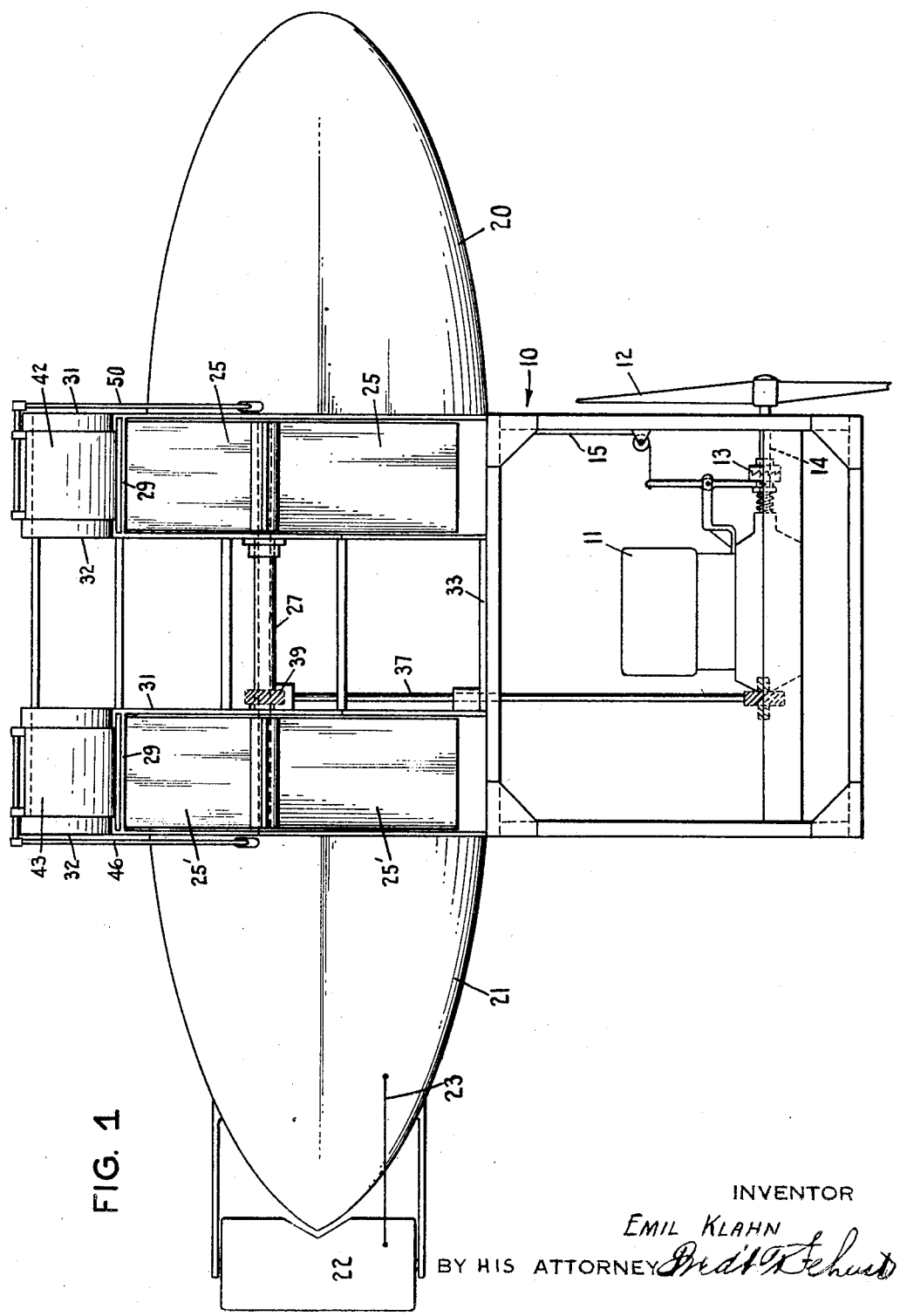
Fig. 1 illustrates the novel aircraft in side elevation, and Fig. 2 in plan.

Referring to the drawings, 10 designates a suitable framing for carrying the various apparatus of the novel aircraft, and at its lower portion supports an internal combustion motor 11. This motor drives in the usual manner a propeller 12 which is designed in the present embodiment principally for translating the aircraft in a horizontal plane; and a clutch 13 is provided in the motor shaft 14, said clutch having an operating connection 15 extending upwardly to the forward cabin 20 from which the craft as a whole is controlled. The rear of the aircraft is provided with a similar cabin 21 to render the same symmetrical in appearance and to afford further storage space as for fuel tanks, etc. A rudder 22 is provided in connection with the craft and is operated in well-known manner from the cabin 20 through cables 23 extending therein.

Aside from the two cabins 20 and 21 and support for motor 11, the craft is entirely open at the bottom portion; and there is arranged transversely between the two said cabins the novel lift apparatus for affording a vertical upward thrust to lift the entire craft independently of its propulsion in a horizontal plane. It is to be understood, however, that I am not limited to the provision of independent means for propelling and lifting the aircraft. Under certain conditions, also, the propeller 12 may be caused to assist in effecting a change in vertical position.

The aforesaid novel lifting apparatus is in the nature of a pair, or preferably two pairs, of tangential fans which are disposed transversely of the longitudinal axis of the aircraft and between the said cabins 20 and 21. A pair of fans comprising the sets of blades or vanes 25 and 26 and a pair of fans comprising the blades or vanes 25' and 26' are mounted upon and for rotation with respective hollow shafts 27 and 28 in casings comprising the top walls 29 and 30 and sides 31 and 32. These sides are largely cutaway, the amount being determined by trial to provide the most efficient action of the fans, and the bottom of the casing is preferably entirely open save for the supporting and separating rods 33. The ends of the casing also are entirely open except for the upper overhanging arcuate portion of the tops, which overhanging portion may be extended as hereinafter more fully set forth to control the effectiveness of the vertical lifting thrust. It will be noted that the drive shafts 27 and 28 of the respective fans of a pair are located in the same horizontal plane and at such distance apart that the blades of the two fans interlock, said blades overlapping at certain periods of the rotation to a predetermined degree. The number of blades, spacing and rotation are such, however, that there is no interference mechanically among the blades when rotated.

Figure 2:
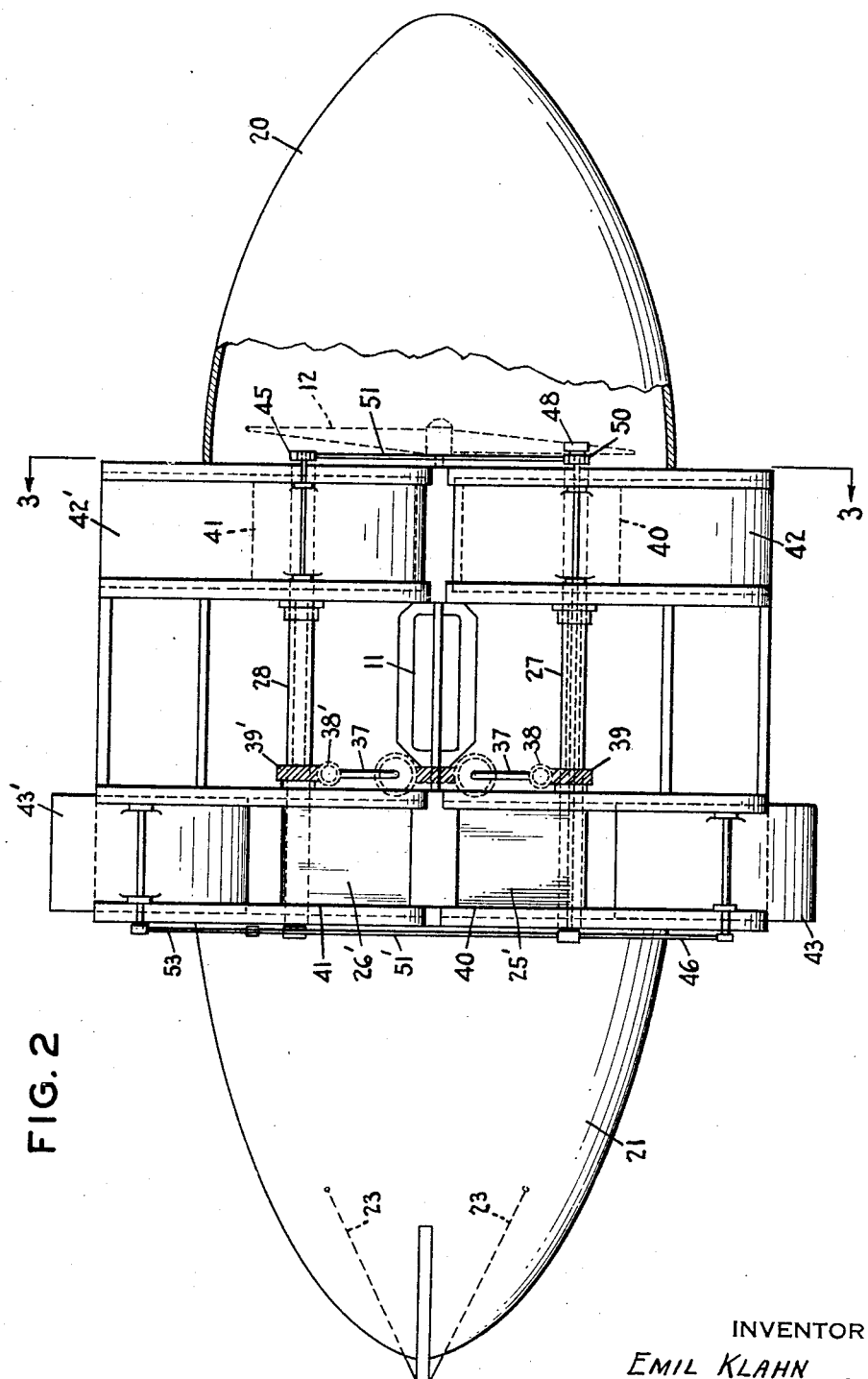
Figure 3:
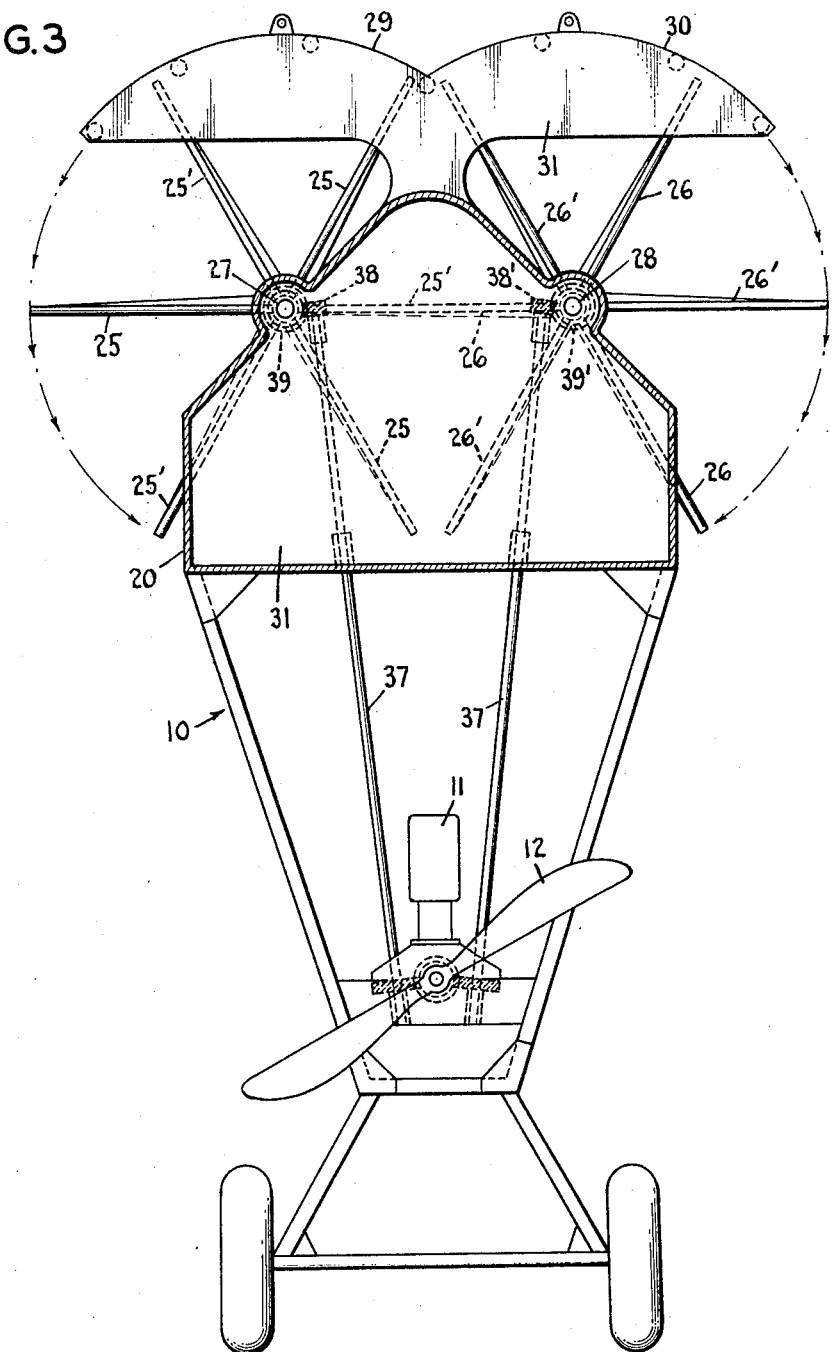
Fig. 3 is a vertical section, taken on the line 3—3, Fig. 2 of the drawings, and looking in the direction of the arrows.
Figure 4:
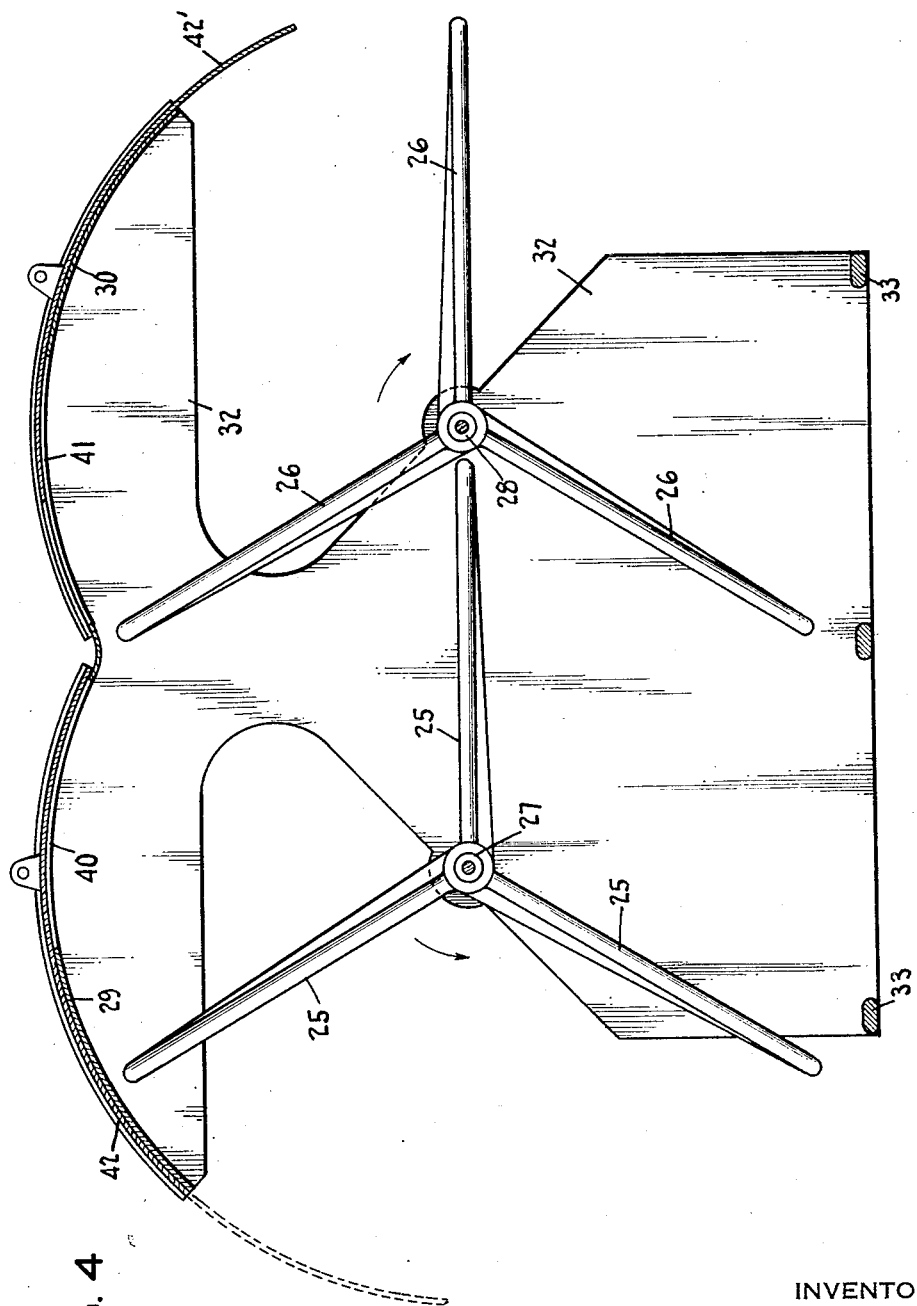
Fig. 4 is an enlarged longitudinal section through the casing for one pair of lifting fans.

To this end, rotation is simultaneously imparted to the blades from the motor 11 through suitable intermediate mechanism which is so arranged as to cause these blades to rotate synchronously in opposite directions, and, furthermore, such that air is projected downwardly thereby through the bottom portion of the casing. For example, a pair of vertically extending shafts 37 is arranged to be driven from the motor 11, said shafts having at their upper ends respective gears 38 and 38' engaging with gears 39 and 39' on the respective hollow shafts 27 and 28. Where a second pair of fans, embodying the blades 25', 26', is utilized, the shafts 27 and 28 are extended to carry the same, the two pairs of fans then being arranged between the fore and aft cabins, as indicated in Fig. 2.

By thus causing the pair of blades of a set to rotate synchronously in opposite directions in an overlapping relationship, not only is space conserved but a maximum reactive force upon the craft to lift the same is provided as there is always an ample supply of air in the casing channel and since this air has the same velocity as the blades the latter do not encounter resistance in their upward movement.

It will be understood that the effect of the upward lifting thrust developed may be varied both by altering the extent of lateral overhang of the tops 29 and 30 of the casing as well as in uncovering respective openings or ports 40 and 41 therein. This may simultaneously be effected in the provision of suitable shutters 42, 42' and 43, 43' for use with the respective pairs of fans and movable relatively to the said tops thereof over the openings therein to uncover the latter and to extend the former. For example, shutter 42' may be attached to one arm 45 of a lever and the shutter 43 to one arm 46 of a lever, said levers having at their opposite ends operating handles 47 and 48, respectively. In the latter instance, the handle 48 is, for convenient accessibility, brought forwardly to the plane of handle 47 through a rod 49 passing through the hollow drive shaft 27, said rod having the lever arm 46 rigidly secured thereto.

Furthermore, the operating handle 47 is connected to an arm 50, oscillatable about shaft 27, by means of a link 51 so that movement of handle 47, for example, to the broken-line position indicated in Fig. 6, will operate to move the shutter 42 in a direction oppositely to that to which the shutter 42' will be moved through corresponding motion of arm 45, and as indicated by the broken-line position.

For moving the rear set of shutters 43, 43', handle 48 is operated and communicates its angular motion through rod 49 to arm 46 for the shutter 43 and through a link 51' connected to a lower extension 52 of the arm 46 and an arm 53 oscillatable on the drive shaft 28 and connected with the shutter 43'. The angular movement of all of the said shutters is about the said respective shafts 27 and 28 as axes, and it is necessary to actuate merely one or both of the handles 47, 48 to provide for the desired change in the lifting effect. If but one handle is operated, for example, handle 48 which controls the shutters for the rear pair of fans, the craft will be caused to sink at the rear and thus cause the longitudinal axis to be inclined in a vertical plane with the fore part of the craft elevated so that advantage may be taken of the effect of propeller 12 in accelerating the ascent which, however, will then not be directly vertical. Similarly, by depressing the fore part of the craft, the descent of the latter may be accelerated.

I claim:

1. In an aircraft: a supporting structure, a motor carried thereby, means connected to the motor for effecting movement in a vertical plane of the craft, said means embodying a pair of shafts synchronously rotatable about horizontal axes, respective fans driven thereby having blades in overlapping relationship, a casing about the fans open at the bottom and partly open at the ends, the top of the casing being provided with normally closed ports positioned over the respective fans, a pair of shutters movable over the respective ports, an arm connected to one of the shutters and oscillatable about the drive shaft of one of the pair of fans, a lever having one arm connected to the other of the shutters and oscillatable about the drive shaft of the other of the pair of fans, and a link connecting the first-named arm and the opposite arm of the said lever, said opposite arm having a hand-engaging portion for operation.

2. In an aircraft: a supporting structure, a motor carried thereby, means connected to the motor for effecting movement in a vertical plane of the craft, said means embodying a pair of shafts synchronously rotatable about horizontal axes, respective fans driven thereby having blades in overlapping relationship, a casing about the fans open at the bottom and partly open at the ends, the top of the casing being provided with normally closed ports positioned over the respective fans, a pair of shutters movable over the respective ports, means to simultaneously operate said shutters to uncover the ports, a further pair of fans with blades in overlapping relationship and driven by the said driving shafts, a casing about said further pair of fans open at the bottom and partly open at the ends, the top of the last-named casing being provided with normally closed ports over the respective fans, a second pair of shutters for controlling the ports of the last-named casing, and means to move said second pair of shutters independently of the first-named pair.

3. In an aircraft: a supporting structure, a motor carried thereby, means connected to the motor for effecting movement in a vertical plane of the craft, said means embodying a pair of shafts synchronously rotatable about horizontal axes, respective fans driven thereby having blades in overlapping relationship, a casing about the fans open at the bottom and partly open at the ends, the top of the casing being provided with normally closed ports positioned over the respective fans, a pair of shutters movable over the respective ports, an arm connected to one of the shutters and oscillatable about the drive shaft of one of the pair of fans, a lever having one arm connected to the other of the shutters and oscillatable about the drive shaft of the other of the pair of fans, a link connecting the first-named arm and the opposite arm of the said lever, said opposite arm having a hand-engaging portion for operation, a further pair of fans with blades in overlapping relationship and driven by the said driving shafts, a casing about said further pair of fans, open at the bottom and partly open at the ends, the top of the casing being provided with normally closed ports over the respective fans, a second pair of shutters for controlling the ports of the last-named casing, means to move said second pair of shutters independently of the first-named pair and comprising an arm oscillatable about the lever-carrying drive shaft and connected with one of the shutters, a lever having one arm connected with the other of said shutters, a rod upon which said lever is secured and mounted for oscillation in the arm-carrying drive shaft, an operating handle secured to said rod, and a link connecting the other arm of said rod-mounted lever with the said arm oscillatable about the lever-carrying drive shaft.

In testimony whereof I affix my signature.
EMIL KLAHN.